3,180,890
IMINO-HALO COMPOUNDS AND PROCESS
FOR THEIR PRODUCTION
Edgar Enders, Leverkusen-Bayerwerk, Engelbert Kühle, Cologne-Stammheim, and Hugo Malz, Leverkusen-Wiesdorf, Germany, assignors to Farbenfabriken Bayer Aktiengesellschaft, Leverkusen, Germany, a German corporation
No Drawing. Filed Nov. 7, 1961, Ser. No. 150,635
Claims priority, application Germany, Nov. 10, 1960,
F 32,512; Jan. 14, 1961, F 32,972
5 Claims. (Cl. 260—566)

The present invention relates to and has as its objects new and useful compounds with parasiticidal and herbicidal activities and to a new process for the preparation thereof. The new compounds of this invention may be represented by the following general formula

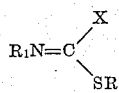

wherein $R_1$ and $R_2$ stand for arbitrarily substituted radicals of the aliphatic, cycloaliphatic, araliphatic, aromatic or heterocyclic series. $R_2$ may also be a secondary amine radical. X stands for chlorine or bromine.

In accordance with the present invention it has been found that sulphenic acid halides can be reacted with isonitriles in a smooth reaction with the formation of N-substituted imino-halo-carbonic acid thio esters (A).

It has further been found that the same N-substituted imino-halo-carbonic acid thio esters are formed by reacting approximately one mol of an isocyanide dihalide with approximately one mol of a mercapto compound (B).

Finally, the same reaction products may be obtained by reacting monosubstituted formamides on sulphenic acid halides in the presence of thionyl chloride.

These three possibilities of reaction may be illustrated in more detail by the following schemes:

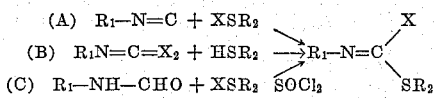

In these formulae as said above, $R_1$ and $R_2$ stand for arbitrarily substituted radicals of the aliphatic, cycloaliphatic, araliphatic, aromatic or heterocyclic series. $R_2$ may also be a secondary amine radical. X stands for chlorine or bromine.

Isonitriles suitable for process (A) are for example ethyl-, cyclohexyl-, phenyl-, p-chlorophenyl- or naphthyl-isonitrile. For process (B) there may be used as isocyanide dihalides for example phenyl-isocyanide dichloride, phenyl-isocyanide dibromide, p-chlorophenyl-isocyanide dichloride, p-nitrophenyl-isocyanide dichloride and others. For process (C), alkyl of 1–12 carbon atoms, for example, methyl-, propyl-, dodecyl-; cyclohexyl-; benzyl-, p-chlorophenyl-, p-nitrophenyl- formamide; and the bis-formyl compounds of hexamethylene-diamine and 1,4-phenylene-diamine, for example, may be used as substituted formamides.

As sulphene halides, perchloro-methyl-mercaptan, pentachloro-sulphene chloride, pentachloro-sulphene bromide, benzthiazolyl-2-sulphene chloride, morpholine-sulphene chloride and others may be used as reaction components. Finally, there may be used as mercaptan component for process (B) aliphatic mercaptans, thiophenols and heterocyclic mercapto compounds.

The addition of sulphenic acid halides to isonitriles as well as the reaction of isocyanide dihalides with mercapto compounds are generally carried out in an inert organic solvent such as benzene, carbon tetrachloride or dioxan, whereas the substituted formamides react most readily with the sulphene halides in an excess of thionyl chloride or in a solvent mixture of thionyl chloride and an inert solvent.

All the above mentioned reactions are expediently carried out at room temperature or slightly elevated temperature.

In the course of further investigating the above invention it has been found that also the unsubstituted formamide, i.e. a compound in which $R_1$ stands for hydrogen reacts in an analogous manner with sulphenic acid halides in the presence of thionyl chloride. However, the imino-halo-carbonic acid thio esters formed as primary reaction products, in contrast to the analogously constituted but N-substituted compounds described above are not stable but immediately transformed into the corresponding thiocyanates with the splitting off of hydrogen halide.

The reaction of this process may be illustrated by the following reaction scheme:

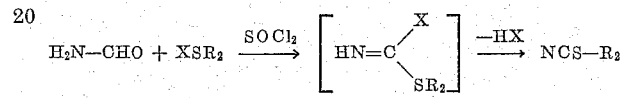

In the above equation, $R_2$ and X stand for the above mentioned radicals.

With the aid of the inventive new process organic thiocyanates are now obtainable in a simple manner, whereas the said partially known thiocyanogen compounds have hitherto been obtainable only with difficulty and in poor yield by the reaction of organic sulphenic acid chlorides with alkali metal cyanides in glacial acetic acid (cf. Houben-Weyl "Die Methoden der organischen Chemie," 4th ed., 1955, vol. IX, p. 864).

Also this reaction is expediently carried out by dissolving or suspending the sulphenic acid chloride (if desired in the presence of an inert solvent) at room temperature in thionyl chloride, subsequently adding dropwise formamide to the mixture and heating the latter to the boil for some time, in order to complete the reaction.

The N-substituted imino-halo-carbonic acid thio esters are valuable intermediate products for the production of pest control agents and drugs and can themselves be used as pest control agents or weed killers.

Also the partially known thiocyanates obtained according to the present invention possess pesticidal, especially nematocidal properties and therefore may be used as pest control and plant protective agents. They also are moreover valuable intermediates for a great variety of organic syntheses.

The new N-substituted imino-halo-carbonic acid thio esters besides their weed killing properties also exhibit nematocidal activities. In this respect they are effective against *Meloidogyne incoginta*. If used as nematocidal agents the active ingredients of this invention should be mixed with suitable inert solvents or diluents, e.g. with lower chloronated hydrocarbons, especially those which also have a nematocidal effect by themselves.

Together with water as an inert diluent an auxiliary solvent such as dimethyl formamide or acetone should be present in equal parts. Also an emulsifying agent in the latter case should be present in the mixture. Such an emulsifier preferably may be an aromatic polyglycol ether such as nonylphenolpolyglycol ether, containing between about 10–20 glycol residues in the molecule.

Also for combating weeds in agriculture, the same formulations can be used. The compounds besides a total herbicidal action also exhibit a selective herbicidal activity in some cases e.g. mustard can be controlled in oat-crops killing the mustard and not damaging the oat. The compounds of the present invention also have bird-repellent properties.

The following examples are given for the purpose of illustrating the invention.

*Example 1*

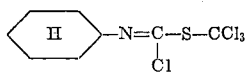

172 g. of perchloromethyl-mercaptan are added dropwise with stirring to a solution of 100 g. of cyclohexyl-isonitrile in 100 ml. of benzene. The temperature is kept at 20° C. by external cooling. The mixture is then allowed to stand for 24 hours and fractionated under vacuum. 204 g., i.e. 75% of the theoretical, of cyclohexyl-imino-chlorocarbonic acid trichloromethyl thio ester of B.P. 120–130° C./0.4 mm. Hg are thus obtained.

*Example 2*

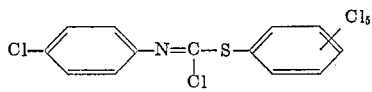

30.4 g. of pentachloro-thiophenol sodium salt are added in portions to a solution of 21 g. of p-chlorophenyl-isocyanide dichloride in 250 ml. of acetone. In a distinctly exothermal reaction there is formed a colorless stiff crystal sludge which is filtered off with suction after ½ hour. The crystal cake is washed with water and after further working up of the filtrate there are obtained 42 g. (92% of the theoretical) of p-chlorophenyl-imino-chlorocarbonic acid pentachlorophenyl thio ester of M.P. 134–137° C.

*Example 3*

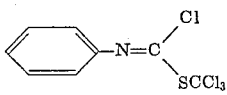

60 g. of formanilide are introduced in portions within ½ hour at 10–15° C. into a solution of 100 ml. of perchloro-methyl-mercaptan in 400 ml. of thionyl chloride. A vigorous evolution of $SO_2$ and HCl sets in immediately. The temperature is raised to about 20–25° C., the reaction mixture after-stirred for about 10 hours, the excess thionyl chloride and perchloro-methyl-mercaptan distilled off and after subsequent distillation under vacuum there are obtained 80 g., i.e. 55% of the theoretical, of phenyl-imino-chlorocarbonic acid trichloromethyl thio ester of B.P. 183–187° C./30 mm. Hg.

The following compounds are obtained in the same manner:

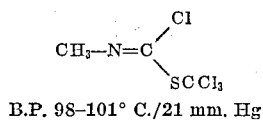

B.P. 98–101° C./21 mm. Hg

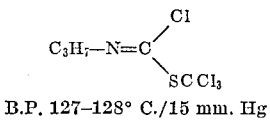

B.P. 127–128° C./15 mm. Hg

*Example 4*

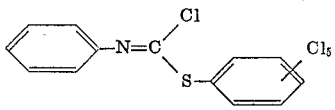

12 g. of formanilide are introduced at 20° C. into a solution of 31.7 g. of pentachlorophenyl-sulphene chloride in 250 ml. of thionyl chloride. A vigorous evolution of $SO_2$ and HCl sets in immediately. The mixture is after-stirred for several hours, the excess thionyl chloride distilled off and phenyl-imino-chlorocarbonic acid pentachlorophenyl thio ester of M.P. 124° C. is obtained in almost quantitative yield.

The following N-substituted imino-halo-carbonic acid esters are obtained in the same manner:

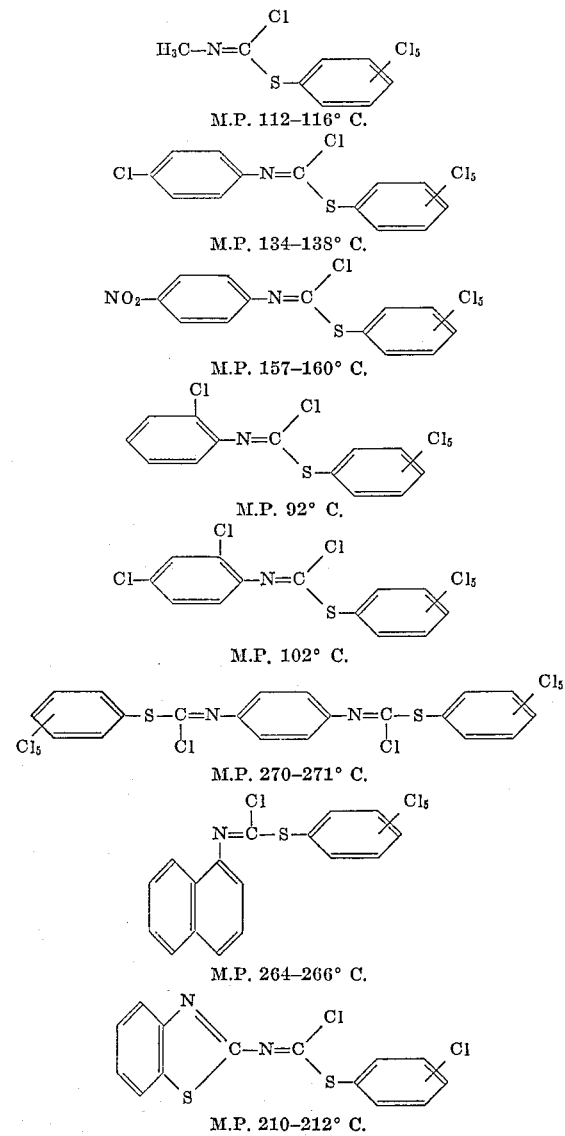

*Example 5*

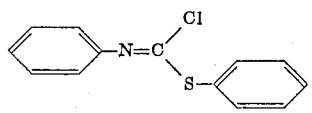

34.5 g. of formanilide are introduced at 15–20° C. into a solution of 41 g. of phenylsulphene chloride in 200 ml. of thionyl chloride, the mixture is stirred at room temperature for 3 hours, the excess thionyl chloride distilled off and after distillation under vacuum there are obtained 50 g. i.e. 71% of the theoretical, of phenyl-imino-chlorocarbonic acid thiophenyl ester of B.P. 200–202° C./16 mm. Hg, M.P. 56–58° C.

The following compounds are obtained in the same manner:

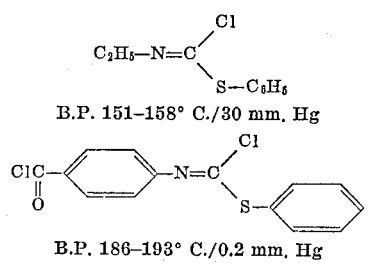

Example 6

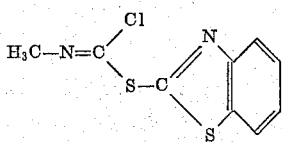

30 g. of methyl formamide are added dropwise at 15° C. to a solution of 101 g. of benzthioazolyl-2-sulphene chloride in 100 ml. of thionyl chloride and 600 ml. of carbon tetrachloride. Crystallisation gradually sets in with a vigorous evolution of gas. The product is after-stirred for 4 hours, heated to boiling point and, after cooling, filtered off with suction, 64 g. i.e. 53% of the theoretical, of methyl-imino-chlorocarbonic acid-(2-benz-thiazolyl)thio ester of M.P. 192–196° C. are thus obtained.

Example 7

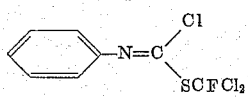

60 g. formanilide are introduced into a solution of 85 g. of dichlorofluoromethyl sulphene chloride in 300 ml. of thionyl chloride (B.P. 100–102° C.) at 12–15° C. within 10 minutes. The mixture is stirred for 10 hours at room temperature. After evaporating the excess of thionyl chloride, the residue is distillated in vacuum. 108 g. (79.5% of the theoretical) of phenylimino chlorocarbonic acid dichlorofluoromethyl thio esters of B.P.$_{18}$ 148–150° C. are thus obtained.

In the same manner there is obtained methylimino-chlorocarbonic acid dichlorofluoromethyl thio ester of B.P.$_{28}$ 78–80° C.

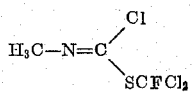

as well as dodecylimino-chlorocarbonic acid dichloro-fluoromethyl thio ester

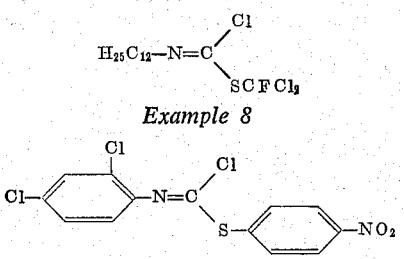

Example 8

51 g. of 4-nitrobenzol sulphene chloride, dissolved in 250 ml. of thionyl chloride, are mixed in portions with 51 g. of 2,4-dichloroformanilide at 10–10° C. After stirring the reaction mixture for several hours, there is obtained a clear solution, which crystallizes after distilling off the excess of thionyl chloride. The (2,4-dichlorophenylimino) - chlorocarbonic acid (4 - nitrophenyl)-thio ester (M.P. 122–124° C.) is obtained in almost quantitative yield.

Example 9

32 g. of chlorine are introduced at 10 to 15° C. with cooling into a suspension of 21 g. of trithiane in 150 ml. of thionyl chloride whereupon the trithiane gradually dissolves. Subsequently 23 g. of formamide are added dropwise at a temperature below 20° C. to the reaction mixture, the latter is after-stirred for a short time, then heated to the boil and the thionyl chloride is finally distilled off. The residual chloromethylthiocyanate (44 g.) is distilled under vacuum. B.P. 63–68° C./14 mm. Hg.

Example 10

60 g. of 1,2,2,2-tetrachlorethane-sulphenic acid chloride are dissolved in 250 ml. of thionyl chloride and treated dropwise with 15 g. of formamide at about 15° C. with external cooling with water. After stirring for 1 hour, the reaction mixture is heated to the boil, the thionyl chloride then distilled off and the residue fractionated under vacuum. 31 g. of tetrachlorethyl-thiocyanate of B.P. 101–102° C./12 mm. Hg are thus obtained.

Example 11

A solution of 17 g. of phenyl-sulphenic acid chloride is treated with 5.5 g. of formamide at room temperature. In order to complete the reaction, the reaction mixture is further stirred for some time, then heated to the boil, the thionyl chloride is subsequently distilled off and the residue subjected to fractional distillation. After the distilling off of small first runnings, phenyl-thiocyanate goes over under a pressure of 18 mm. Hg at 105–110° C. Yield: 11 g.

Example 12

16 g. of pentachlorophenyl-sulphenic acid chloride are dissolved in 70 ml. of thionyl chloride and this solution is treated with 3 g. of formamide at 10–15° C. After stirring at normal temperature for a short time, the reaction mixture is heated to the boil and subsequently concentrated under vacuum. After distilling off the thionyl chloride, 15 g. of pentachlorophenyl-thiocyanate of M.P. 180–182° C. are obtained.

We claim:

1. Imino-halo-carbonic acid ester of the formula

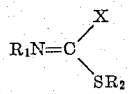

in which $R_1$ stands for a member selected from the class consisting of cyclohexyl, alkyl of 1–12 carbon atoms, phenyl, naphthyl, mono chloro phenyl, dichloro phenyl, nitrophenyl, benzyl, and benzothiazolyl; X stands for a member selected from the group consisting of chlorine and bromine; and $R_2$ stands for a member selected from the group consisting of chloro-lower alkyl, chloro-monofluoro-lower alkyl, phenyl, chloro-phenyl, mononitro-phenyl, benzothiazolyl and morpholino.

2. The compound of the formula

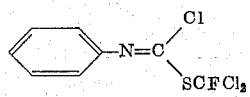

3. The compound of the formula

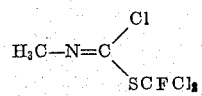

4. A compound of the formula

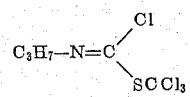

5. Process for the production of imino-halo-carbonic acid esters of the formula

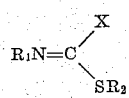

in which $R_1$ stands for a member selected from the class consisting of an alkyl group of 1–12 carbon atoms, cyclohexyl, phenyl a monochloro substituted phenyl dichloro, substituted phenyl, nitro substituted phenyl, benzyl and benzothiazolyl; X stands for a member selected from the group consisting of chlorine and bromine; and $R_2$ stands for a member selected from the group consisting of chloro lower alkyl, chloro-monofluoro-substituted lower alkyl, phenyl, a chloro substituted phenyl, benzothiazolyl and morpholino comprising reacting an isocyanide dihalide selected from the group consisting of an isocyanide dichloride and an isocyanide dibromide with about an equal amount of a mercapto compound in the presence of an effective amount of thionyl chloride.

References Cited by the Examiner
UNITED STATES PATENTS

| | | | |
|---|---|---|---|
| 2,201,156 | 5/40 | Coleman et al. | 260—454 |
| 2,486,090 | 10/49 | Abramovitch | 260—454 |
| 2,863,920 | 12/58 | Welch | 260—566 |
| 2,928,876 | 3/60 | Spivack et al. | 260—566 |
| 2,965,537 | 12/60 | Rosen | 260—454 |

FOREIGN PATENTS 945,947   5/49   France.

OTHER REFERENCES

Havlik: J.A.C.S., vol. 77, pp. 5171–5172 (1955).

CHARLES B. PARKER, *Primary Examiner.*

L. ZITVER, *Examiner.*